United States Patent [19]

Tajima et al.

[11] 4,000,945

[45] Jan. 4, 1977

[54] INFORMATION RECORDING APPARATUS

[75] Inventors: Kunio Tajima; Touhei Kawakami; Seiichi Hayashi, all of Hitachi, Japan

[73] Assignee: Hitachi, Ltd., Japan

[22] Filed: Jan. 3, 1975

[21] Appl. No.: 538,335

[30] Foreign Application Priority Data

Jan. 9, 1974 Japan ............................... 49-5280
Feb. 19, 1974 Japan ............................. 49-18581

[52] U.S. Cl. ..................................... 355/45; 355/5
[51] Int. Cl.[2] ......................................... G03B 13/28
[58] Field of Search .................. 355/5, 3 R, 44, 45, 355/64

[56] References Cited

UNITED STATES PATENTS

| | | | |
|---|---|---|---|
| 3,166,420 | 1/1965 | Clark | 355/5 |
| 3,168,857 | 2/1965 | Hutto | 355/5 |
| 3,519,344 | 7/1970 | Clark | 355/5 |
| 3,697,176 | 10/1972 | Kuehnle | 355/5 |

FOREIGN PATENTS OR APPLICATIONS

| | | | |
|---|---|---|---|
| 595,718 | 7/1959 | Italy | 355/5 |

*Primary Examiner*—R. L. Moses
*Attorney, Agent, or Firm*—Craig & Antonelli

[57] ABSTRACT

In an apparatus for electrographically recording information on a microfilm, a monitor light source is additionally provided to allow the checking of the recorded state while the film is held at the recording position, and an arrangement for the modification or addition of information is provided if necessary.

6 Claims, 8 Drawing Figures

INFORMATION RECORDING APPARATUS

BACKGROUND OF THE INVENTION

1. Field of the Invention

The present invention relates in general to an information recording apparatus and more particularly to an apparatus for reliably recording information on a microfilm.

2. Description of the Prior Art

The recording of information on a microfilm has been performed for the purpose of reducing a space for accommodating or storing the information and automating the retrieval operation of the recorded information. For the recording of the information on the microfilm, a recording apparatus is required which allows an easy and reliable recording of documents commonly handled in offices.

In general, a roll or sheet of microfilm has a number of information recording frames or areas whether the film is in the form of roll or card. On the other hand, when the information or document to be stored is recorded on the microfilm with the originally recorded information being erased, it is desirable to easily monitor or check the recorded state after every recording in the individual recording areas. Further, when any addition or modification is to be made on the recorded information, it is advantageous to make such addition or modification without adding any damages or stains to the recording surface. In other words, if the modification is made on the recorded information and the modified information is reproduced on the microfilm, there may arise a disadvantage that the quality of the reproduced image is subjected to degradation.

SUMMARY OF THE INVENTION

An object of the present invention is to provide an information recording apparatus which assures a reliable and easy recording of information.

Another object of the invention is to provide an information recording apparatus in which an optical monitor system for checking the recorded information is constructed in an inexpensive arrangement.

Further object of the invention is to provide an information recording apparatus which allows a simplified addition or modification of information.

In an information recording apparatus according to the invention, monitor light is applied to a photosensitive film placed in a predetermined position for recording from the back side of the film and the light image transmitted through the photosensitive film is projected onto a screen for the monitoring observation.

DETAILED DESCRIPTION OF THE PROFERRED EMBODIMENTS

Figure 1:
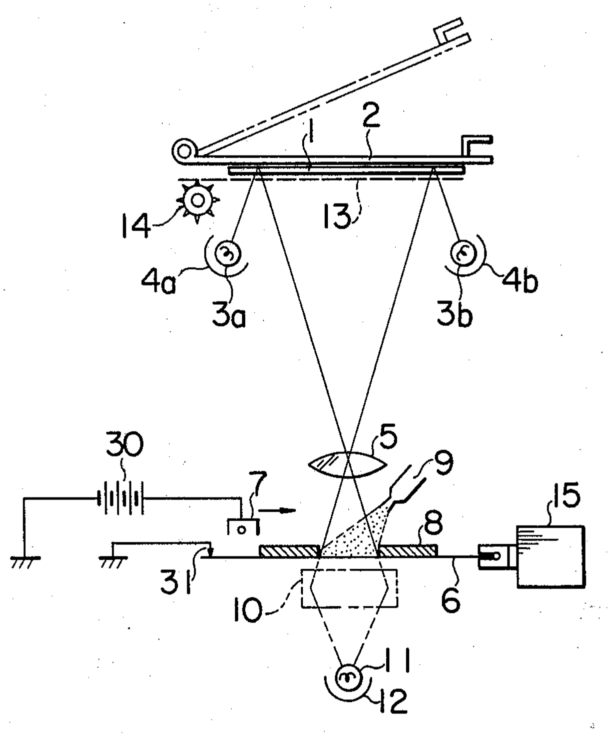
FIG. 1 shows schematically a construction of an information recording apparatus according to an embodiment of the present invention.

Referring to FIG. 1 showing an information recording apparatus according to the present invention, reference numeral 1 indicates a frame fitted with a transparent plate of, for example, glass for supporting thereon an information carrying original which is adapted to be covered at the rear surface thereof by a pivotally mounted cover member 2. The surface of the original is illuminated from the interior of the original supporting frame 1 by means of a pair of recording light sources 3*a* and 3*b* which may be constituted by conventional halogen gas lamps. In order to utilize most efficiently light from these light sources 3*a* and 3*b* for illuminating the information carrying surface of the original, appropriate reflectors 4*a* and 4*b* may be provided for the light sources 3*a* and 3*b*, respectively. An image of light reflected from the information carrying surface of the original is reduced and projected to a photosensitive film 6 through an optical recording system 5.

Figure 2:
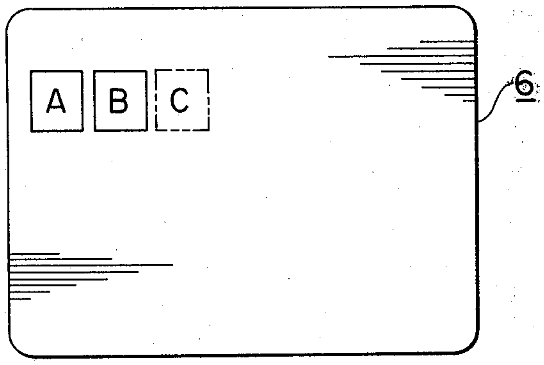
FIGS. 2 and 3 are plan and side views of a photosensitive film, respectively.
Figure 3:
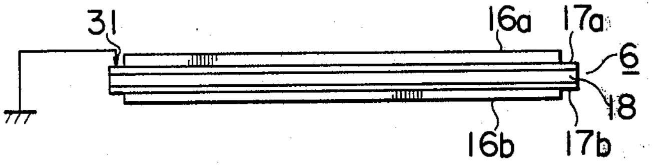

As is shown in FIGS. 2 and 3, the photosensitive film 6 comprises a substrate 18 such as polyestel or the like material having transparent conductive layers 17*a* and 17*b* coated at opposite surfaces thereof. The layers 17*a* and 17*b* are covered with transparent photoconductive layers 16*a* and 17*b* of, for example, organic material. Thus, the film 6 constitutes a transparent photosensitive film for electrophotography in a form of "fiche" or card.

Again in FIG. 1, numeral 7 denotes means for uniformly charging the photoconductive layers 16*a* and 16*b*of the photosensitive film 6. As the charging means 7, a corona discharge source energized from a high D.C. voltage source 30 may be employed. It should be noted that the charging means 7 is so supported that it can be moved above recording frames or areas of the photosensitive film 6 thereby to uniformly charge the recording area in which information is to be recorded. Numeral 8 denotes a film pressing frame which has a window corresponding to one recording area of the photosensitive film 6 and serves to expose a selected recording area at the recording step with all the other portions covered, forcibly maintaining the photosensitive film planar. The film pressing frame 8 also prevents a liquid developer from being spattered around when the recorded information is developed. Numeral 9 is a nozzle for ejecting the developer onto the recording area of the photosensitive film 6 after the exposure thereof. A monitor lens system 10 is disposed opposite to the recording lens system 5 with the photosensitive film 6 interposed therebetween. The monitor lens system 10 is adapted to receive light from a monitor light source 11 having a reflector 12 for improving the illuminating efficiency thereof. Disposed below the original supporting frame 1 is a monitor screen 13 onto which the image on the film 6 is projected from the monitor light source 11 through the lens systems 10 and 5. The monitor screen 13 may comprise a semi-transparent material adapted to be displaced along the underside of the supporting frame 1 through a feeding mechanism 14 which may be constituted by sprockets for driving the monitor screen 13 and guide rails for indexing the latter correctly at the position beneath the original supporting frame 1. Numeral 15 designates a film reversing mechanism for reversing the film 6 for the monitoring observation. The film reversing mechanism 15 may comprise a chuck for gripping an end of the film 6 and a rotary solenoid. Although the illustration is omitted, it is necessary to provide a conventional two-axis or coordinate driving mechanism for the film holding structure in order to allow any desired recording area of the film 6 to be positioned at the exposure region defined by the film pressing frame 8. It is further noted that the aforementioned conductive layer 17*a* (or 17*b*) is connected through a lead 31 to ground, thereby to discharge the charges passed through the photoconductive layer 16*a* (or 16*b*) at the exposure step. In the case where the film pressing frame 8, the nozzle 9 and the lens system 10 interfere or obstruct the smooth reversing of the film 6 for the monitoring observation, the film 6 has to be moved to a space where the film 6 can be freely reversed. Alternatively, the above obstacles must temporarily be removed to unobstructing locations. Since the means suited for such a purpose can be easily conceived by those skilled in the art, further description thereof will be unnecessary.

Now, the operation of the apparatus with the above-described arrangement will be described at first by referring to the case where original information is recorded on the upper surface of the photosensitive film 6, namely on the photoconductive layer 16*a*. When the recording is to be made in a recording frame or area A of the photosensitive film 6 shown in FIG. 2, the film 6 is moved by the two-axis driving mechanism (not shown) to the position at which the recording area A is aligned with the exposure region defined by the window formed in the film pressing frame 8, while the information carrying original is laid on the original supporting frame 1 with the surface having the information to be recorded facing downwards. Subsequently, the charging means 7 is displaced in the direction indicated by arrow so as to charge uniformly the surface portion of the film 6 corresponding to the recording area A and thereafter reset to the shown starting position. Then, the light sources 3*a* and 3*b* are energized to illuminate the information carrying surface of the original and the image of the information is projected on the recording area A through the lens system 5 at a reduced scale. In this case, the monitor screen 13 is of course withdrawn. When the photo-sensitive film 6 is thus exposed, a corresponding electrostatic latent image is produced on the recording area A. A developer is ejected by the nozzle 9 to develop the latent image. After the development, the monitor screen 13 is drawn below and along the original supporting frame 1 and the light source 11 is energized. Thus, the recorded or developed image can be projected on the monitor screen 13 for the purpose of checking the recorded state. Similar recording may be carried out for the recording areas B and C. The film 6 can be taken out of the recording apparatus for observation or storage thereof before the completion of recording for all the recording areas such as A, B, C, etc. Further, it is possible to effect the recording for any given recording area at any time.

Next, the operation of the apparatus will be described referring to the case where the content of information recorded in the recording area C is to be modified or changed to a different content. It will be appreciated that the image projected to the monitor screen 13 appears in the reversed state since the image is observed from the rear or upper side of the monitor screen 13. Accordingly, in order to obtain the normal image, the film 6 has to be reversed. In such a case, the film reversing mechanism 15 is operated to reverse the film 6. Now, the normal image can be observed at the monitor screen 13 by projecting the reversed image on the film 6 thereto by means of the light source 11 and the lens systems 10 and 5. The modification of the information can be carried out in the manner described in the following.

With the original cover 2 being removed, a transparent sheet for the modification is laid on the original supporting frame 1. The modification sheet should preferably be of a material suited for the writing with ink in oil or water. Subsequently, the monitor screen 13 is drawn to receive the projected image from the reversed film 6. When the image is observed from the upper side of the modification sheet, the normal image can be seen as if it was projected on the sheet itself. The content of modification is written on the sheet. When the monitor screen 13 is thereafter withdrawn, the back of the writing will face to the lens system 5. The written information can thus be recorded on the back surface (the layer 16*b*) of the film 6 through the recording process comprising the charging, exposure and development as hereinbefore described in conjunction with the recording of information. When projected by transmitting light, the content of modification forms a composite image in cooperation with the originally recorded information without incurring any deviation in position. The recording on the back surface (the layer 16*b*) of the film 6 as described above provides an advantage in that stains or damages of the film can be avoided which may possibly occur when the modification of the recorded content is directly made on the originally recorded surface (layer 16*a*).

Figure 4:
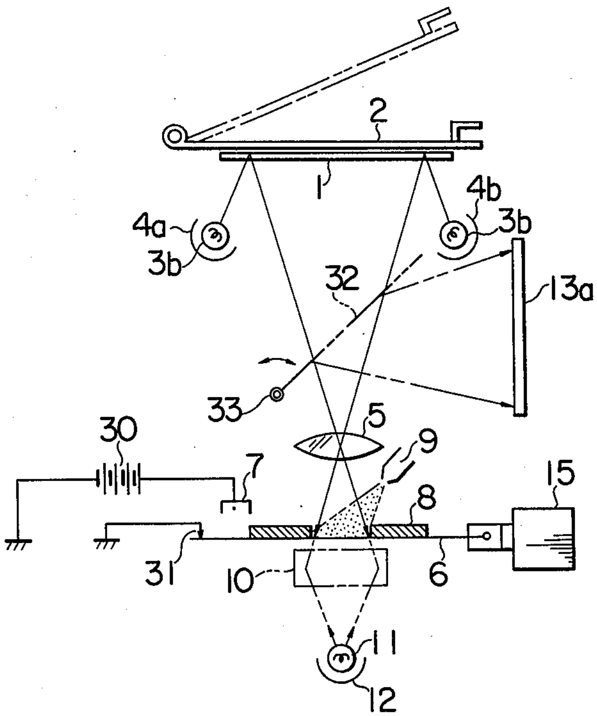
FIG. 4 shows schematically a construction of an information recording apparatus according to another embodiment of the invention.

FIG. 4 shows another embodiment of the information recording apparatus according to the present invention which is substantially similar to the one shown in FIG. 1 except that the monitor screen 13*a* is mounted on a frame other than the original supporting frame 1 and that a reflecting mirror 32 is provided to project the image for the monitoring observation to the screen 13*a*. The reflecting mirror 32 should preferably be disposed between the lens system 5 and the original supporting frame 1. With such a arrangement, the lens system 5 can be used both for the recording and the monitoring, which results in the inexpensiveness of the apparatus. The reflecting mirror 32 may be advantageously mounted on a rotatable shaft 33 at one end thereof to be swing in the direction indicated by arrow so that the mirror 32 does not interrupt the projecting path at the recording step. When a half mirror is employed for the reflector 32, the mirror can be mounted fixedly.

The information recording apparatus according to the present invention based on the electrophotography principle is also operative by additionally employing a transfer process. In the case of the aforementioned embodiments, the film 6 is formed of a photosensitive or photoconductive material. Since this type of film is expensive, it is sometimes desirable to use a non-sensitized film. In this case, the transfer by means of a photosensitive master may be utilized. Because the same arrangement of the apparatus as described hereinbefore can be employed, description will now be made only relative to the recording process.

Figure 5A:
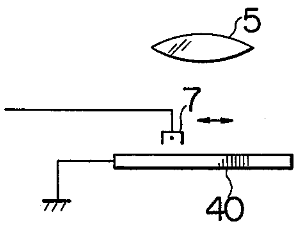
FIGS. 5A to 5D illustrate schematically photographic process steps employing a transfer process.
Figure 5B:
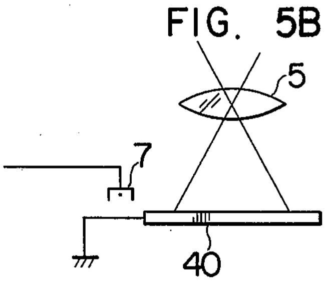
Figure 5C:
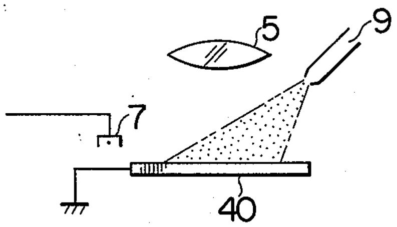
Figure 5D:
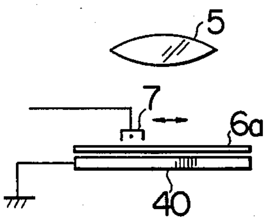

Referring to FIGS. 5A to 5D, a photosensitive or photoconductive master film 40 is used instead of the photosensitive film 6 and subjected to the uniform charging as is shown in FIG. 5A. Thereafter, the master film 40 is subjected to the exposure (FIG. 5B) and developed (FIG. 5C) in the same manner as is in the case of the aforementioned embodiments. Subsequently, a non-sensitized film *6a* (which may be however photosensitive if necessary) is arranged above the image carrying surface of the master film 40 and a transfer electric field is applied by the charging means 7. As a result, the image forming toner or developer on the master film 40 is transferred onto the surface of the film *6a*. When the transfer process is employed in the recording as described above, the film *6a* need not have a photosensitivity and hence is inexpensive.

Although the preferred embodiments of the invention have been described in the foregoing, it should be understood that the invention is never restricted to these embodiments and many modifications and variations can be made without departing from the spirit and scope of the invention.

We claim:

1. An information recording apparatus comprising hold means for holding a photosensitive film at a predetermined position, exposure means for exposing the photosensitive film to light from an information carrying original to be recorded, development means for developing the exposed photosensitive film, monitor light source means disposed opposite to the exposure means with the developed photosensitive film interposed therebetween for directing monitor light through said developed photosensitive film,-an optical system for projecting the monitor light passed through said developed photosensitive film to a monitor screen, and a mechanism coupled to said hold means for reversing the developed photosensitive film to obtain a normal image at said monitor screen.

2. An information recording apparatus as set forth in claim 1, wherein the exposure means includes an optical lens system interposed between the original and the photosensitive film in said predetermined position, the optical lens system being positioned in a light path of the monitor light from the monitor light source means to the monitor screen.

3. An information recording apparatus as set forth in claim 2, further comprising a reflector mirror disposed between the original and the optical lens system.

4. An information recording apparatus comprising: hold means for holding a photosensitive film at a predetermined position; exposure means for exposing the photosensitive film to light from an information carrying original to be recorded, said exposure means including a transparent frame for supporting said information carrying original to be recorded, recording light source means for illuminating the transparent frame from the inner side thereof and an optical lens system interposed between said photosensitive film and the transparent frame; development means for developing the photosensitive film; and monitor means including a semi-transparent sheet movable along the inner side of the transparent frame and monitor light source means for directing monitor light through said developed photosensitive film, said monitor light passing through said developed photosensitive film being projected onto said semi-transparent sheet by said optical lens system.

5. An information recording apparatus as set forth in claim 4, wherein the hold means includes a mechanism for reversing the photosensitive film.

6. An information recording apparatus as set forth in claim 4, further comprising transfer means for transferring the information on the developed photosensitive film onto a non-sensitized film.

* * * * *